US006257679B1

(12) United States Patent
Chino et al.

(10) Patent No.: US 6,257,679 B1

(45) Date of Patent: Jul. 10, 2001

(54) REAR AXLE FOR INDUSTRIAL VEHICLES

(75) Inventors: Kenji Chino; Kenichi Katae; Yoshihisa Iwanaga, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/345,797

(22) Filed: Jul. 1, 1999

(30) Foreign Application Priority Data

Jul. 3, 1998 (JP) ........................................ 10-189260

(51) Int. Cl.[7] ........................................ B60B 35/00

(52) U.S. Cl. ........................................ 301/124.1

(58) Field of Search ........................................ 301/124.1, 125, 301/126, 131, 132; 180/905, 906; 280/124.125, 93.512

(56) References Cited

U.S. PATENT DOCUMENTS 1,899,347 * 2/1933 Mogford et al. .................. 301/124.1
2,911,262 * 11/1959 Franck .................. 301/124.1
4,867,641 9/1989 Okuno et al. .
5,664,847 * 9/1997 Bear et al. .................. 301/124.1
5,810,377 * 9/1998 Keeler et al. .................. 180/905

FOREIGN PATENT DOCUMENTS 665 172 9/1938 (DE) .................. 63/18
2812011 * 12/1978 (DE) .................. 301/132
0 161 815 A1 11/1985 (EP) .
0 383 040 8/1990 (EP) .
356830 * 1/1905 (FR) .................. 301/132
499402 * 1/1920 (FR) .................. 301/124.1
2 061 841 5/1981 (GB) .
2 134 430 8/1984 (GB) .
2 261 411 5/1993 (GB) .
58-167217 10/1983 (JP) .
6-48150 2/1994 (JP) .
7-41296 2/1995 (JP) .
9-309308 12/1997 (JP) .
9-309309 12/1997 (JP) .
76102255 2/1989 (TW) .

* cited by examiner

*Primary Examiner*—S. Joseph Morano
*Assistant Examiner*—Long Bao Nguyen
(74) *Attorney, Agent, or Firm*—Morgan & Finnegan, LLP

(57) ABSTRACT

A rear axle beam for pivotally supporting a body frame of an industrial vehicle, including a boss-engaging areas formed on each end of the axle beam, and at least a pair of bosses, is provided. Each boss includes an axle-engaging area and is fixed to a respective end of the axle beam such that each axle-engaging area engages with a corresponding one of the boss-engaging areas.

The novel axle beam reduces the force applied to weld beads between the bosses and the rear axle body of industrial vehicles.

10 Claims, 4 Drawing Sheets

REAR AXLE FOR INDUSTRIAL VEHICLES

BACKGROUND OF THE INVENTION

The present invention relates to a rear axle for forklifts, and more particularly, to a rear axle to which bosses for supporting kingpins are welded.

Generally, in forklifts, a rear axle for supporting rear wheels is pivotally attached to a vehicle frame for the stability of the vehicle while running. As shown in FIG. 8, a rear axle 31 includes a rear axle body 34 and pairs of bosses 35*a,* 35*b*. The rear axle body 34 includes a first vertically extending plate 32 and second plates 33*a,* 33*b,* which are parallel to one another and are located on the upper and lower edges of the first plate 32, respectfully. The pairs of bosses 35*a,* 35*b* support kingpins 39*a,* 39*b* and are welded to the ends of the rear axle body 34. A center pin 36 is received in the center of the rear axle body 34. The rear axle 31 is pivotally supported through the center pin to the rear of the vehicle frame (not shown).

As shown in FIGS. 8 and 9, the bosses 35*a,* 35*b* are generally columnar and have proximal surfaces. The bosses 35*a,* 35*b* are fixed to the rear axle body 34 by engaging the proximal surfaces with the ends of the first and second plates 32, 33*a,* 33*b* and by welding the contact lines between the bosses 35*a,* 35*b* and the plates 32, 33*a,* 33*b.*

If the rear axle can constantly pivot, the stability of vehicle may degrade when the vehicle turns carrying a heavy load or when running on bumpy surfaces carrying a load at a high position.

Japanese Unexamined Patent Publication No. 58-167217, 9-309308, and 9-309309 describe a technology for locking a rear axle by a lock mechanism when a centrifugal force applied to the vehicle exceeds a predetermined value or when the position of the load exceeds a predetermined limit.

The rear axle is locked by locking a damper that is arranged between the vehicle frame and the rear axle. That is, closing a passage for supplying and draining hydraulic oil to the damper locks the damper. Also, opening the passage unlocks the damper, thus permitting the rear axle to pivot.

Reaction forces from a set of rear wheels are mostly applied to the upper bosses 35*a*. The reaction forces from the rear wheels increase when the rear axle 31 is locked. However, in the prior art rear axle 31, the bosses 35*a,* 35*b* have the same shape and the length of the weld beads 37 are also the same. As shown in FIG. 9 (only the boss 35*a* is shown), each boss 35*a,* 35*b* and the plates 32, 33*a,* 33*b* make contact over a vertical planar area, and corners formed by the contact are welded. Accordingly, only the weld beads receive the strong forces applied to the upper bosses 35*a*. However, the weld beads in the prior art may not provide sufficient strength.

SUMMARY OF THE INVENTION

An objective of the present invention is to reduce the force applied to weld beads between the bosses of and the rear axle body of industrial vehicles.

To achieve the above objective, the present invention provides a rear axle beam for pivotally supporting a body frame of an industrial vehicle, which includes a boss-engaging areas formed on each end of the axle beam, and a pair of bosses. Each boss includes an axle-engaging area and is fixed to a respective end of the axle beam such that each axle-engaging area engages with a corresponding one of the boss-engaging areas. Either the axle-engaging areas or the boss-engaging areas include recess means, and the others include protrusion means. The protrusion means are engaged with the recess means, respectively. The boss is welded to the axle beam.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2(*b*) is a partial plan view showing the boss of FIG. 1;

FIG. 5(*b*) is a cross sectional view taken on the line B—B of FIG. 5(*a*);

DETAILED DESCRIPTION OF THE PREFERRED EMBODIMENTS

Figure 1:
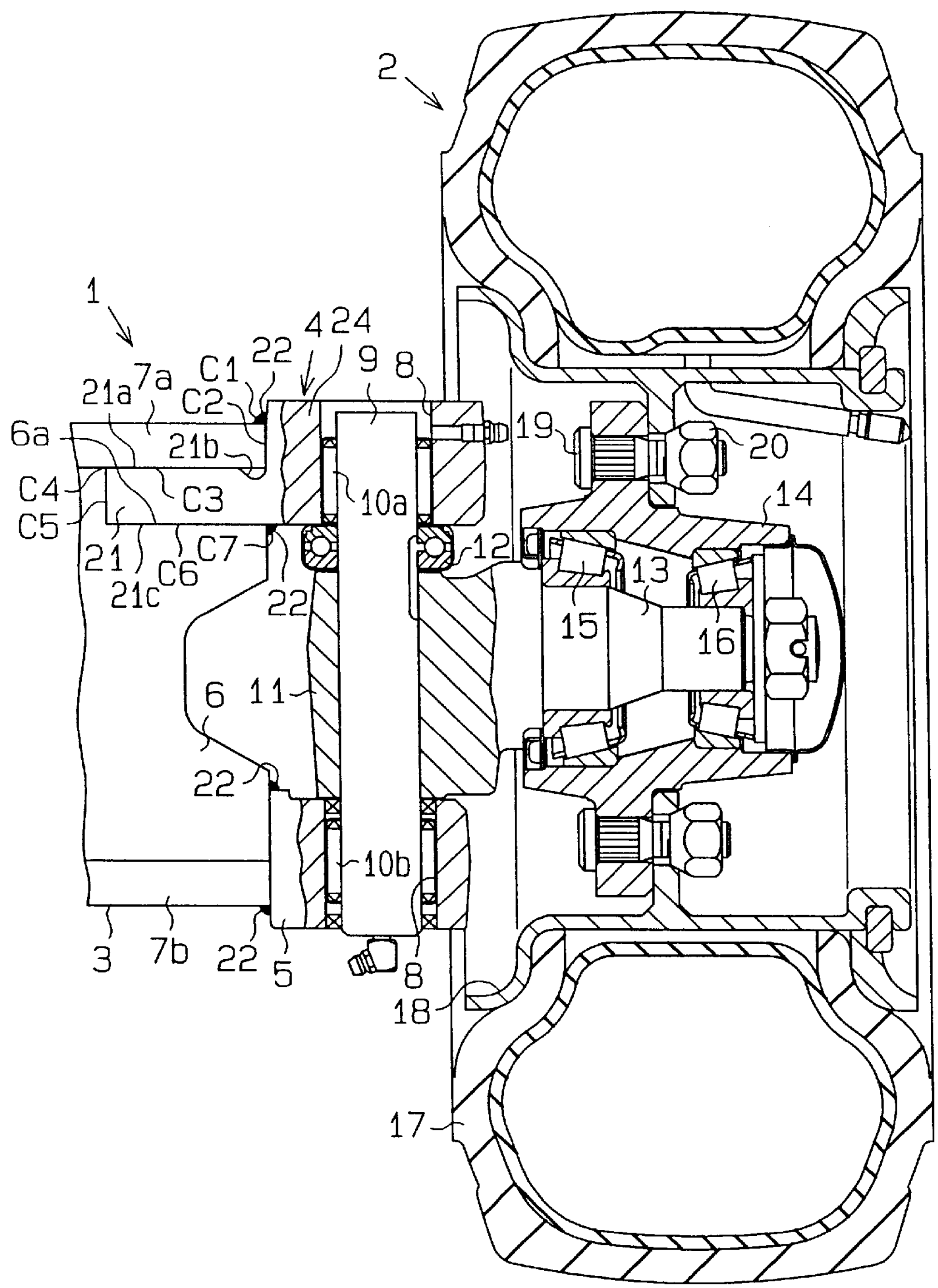
FIG. 1 is a partial cross sectional view showing a boss according to a first embodiment of the present invention.

To avoid a redundant description, like or same reference numerals are given to those components which are the same as the corresponding components of the first embodiment.

A first embodiment of the present invention will now be described with reference to FIGS. 1 and 2. The rear axle 1 includes an axle body 3 and upper and lower bosses 4, 5 as in the prior art rear axle 31. The axle body 3 includes a vertical plate 6 and horizontal plates 7*a,* 7*b,* which are located at the upper and lower edges of the vertical plate and are parallel to one another. The upper and lower bosses 4, 5 are welded to the ends of the horizontal plates 7*a,* 7*b*.

Each boss 4, 5 includes a pin housing 24. A hole 8 is formed in the pin housing 24 of each boss 4, 5. A kingpin 9 is rotatably received in the bosses 4, 5 through needle bearings 10*a,* 10*b*. A thrust bearing 12 is attached to the kingpin 9 between a steering knuckle 11 and the upper boss 4. The thrust bearing 12 permits relative rotation between the steering knuckle 11 and the upper boss 4. The steering knuckle 11 includes a spindle 13, which extends horizontally. A cylindrical hub 14 is rotatably supported on the spindle 13 through bearings 15, 16. A wheel rim 18 is integrally attached to the hub 14 by bolts 19 and nuts 20, thus allowing a tire 17 to rotate with respect to the rear axle 1.

The attachment structure of the upper boss 4 to the axle body 3 will now be described. The upper boss 4 includes a projection 21, which is received in the axle body 3, between the vertical plate 6 and the upper horizontal plate 7*a*. The upper and lower surfaces of the projection 21 are parallel, rectangular and planar. The projection 21 has the same width and about half the thickness as the boss 4. The upper boss 4 and the projection 21 are forged. A concavity, or a corner recess 21*b,* is formed on the upper surface of the proximal end of the projection 21*a,* between the projection 21 and the housing so that the end surface of the upper horizontal plate 7*a* makes good contact with the upper boss 4 and so that the upper surface of the projection 21*a* makes good contact with the lower surface of the upper horizontal plate 7*a*.

Figure 2A:
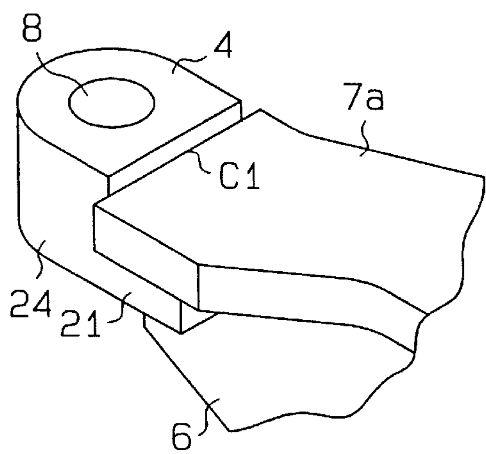
FIG. 2(*a*) is a partial perspective view showing the boss of FIG. 1.
Figure 2B:
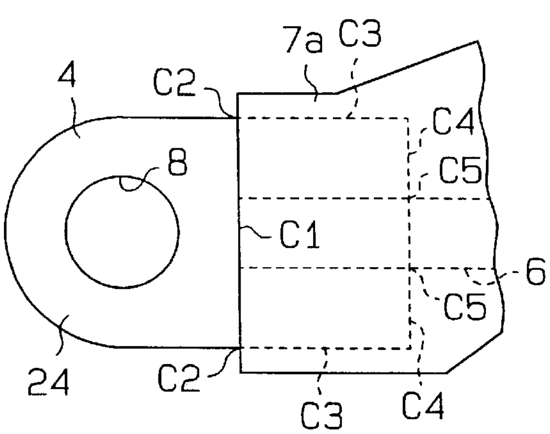

As shown in FIG. 1, in the axle body 3, a step 6*a* is formed on the vertical plate 6 to correspond to the projection 21 of the upper boss 4. The upper surface of the projection 21*a* contacts the lower surface of the upper horizontal plate 7*a,* and the lower surface of the projection 21 contacts the upper surface of the step 6*a*. That is, the projection 21 of the upper boss 4 is received between the vertical plate 6 and the lower surface of the upper horizontal plate 7*a*.

The upper boss 4 is welded to the axle body 3 at seven types of corners C1–C7. A first corner type C1 is defined between the upper surface of the upper horizontal plate 7*a* and the proximal end surface of the upper boss 4. A second corner type C2 is defined between the end surface of the upper horizontal plate 7*a* and sides of the upper boss 4. A third corner type C3 is defined between the lower surface of the upper horizontal plate 7*a* and the sides of the projection 21. A fourth corner type C4 is defined between the lower surface of the upper horizontal plate 7*a* and the exposed parts of the end surface of the projection 21. A fifth corner type C5 is defined between the side surfaces of the vertical plate 6 and the end surface of the projection 21. A sixth corner type C6 is defined between the side surfaces of the vertical plate 6 and the lower surface 21*c* of the projection 21. A seventh corner type C7 is defined between the end surface of the vertical plate 6 and the lower surface 21*c* of the projection 21. The welds are referred to collectively as weld beads 22.

The reaction force of the load on the wheel 2 is applied to the upper and lower bosses 4, 5. Since the force applied to the steering knuckle 11 is transmitted to the upper boss 4 through the thrust bearing 12, the upper boss 4 receives most of the load.

The projection 21 of the upper boss 4 is received between the vertical plate 6 and the upper horizontal plate 7*a,* and the upper boss 4 is welded to the axle body 3. Accordingly, when a load is applied to the upper boss 4, the axle body 3 directly receives the load through direct engagement with the upper boss 4. This reduces the load received by the weld beads 22 (per unit length of weld) compared to the prior art, in which the weld beads receive the entire load.

Manufacturing the upper boss 4 and the axle body 3 is relatively easy because the projection 21 is rectangular and formation of the step 6*a* is the only additional step to be performed on the axle body 3.

When a force, whether upward or downward, is applied to the upper boss 4, most of the force is received by the vertical plate 6 and the upper horizontal plate 7*a* because the upper surface of the step 6*a* and the lower surface of the upper horizontal plate 7*a* are parallel to and in contact with one another.

Since part of the load applied to the upper boss 4 is transferred directly to the axle body 3 and the total length of the weld beads 22 is longer, the proportion of the load transferred through the weld beads 22 per unit length of weld bead is reduced.

The present invention will further be embodied as follows.

The shape of the projection 21 may have other shapes, such as triangular, semi-circular and polygonal shapes. In this case, substantially the same advantages are obtained.

Figure 3:
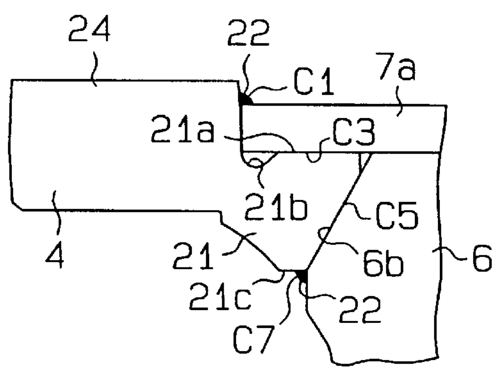
FIG. 3 is a partial diagrammatic side view showing another embodiment.

As shown in FIG. 3, an inclined surface 6*b*, or a chamfer, may be formed on a part of the vertical plate 6 corresponding to the upper boss 4. The projection 21 of the upper boss 4 is wedge-shaped corresponding to a wedge-shaped space between the lower surface of the upper horizontal plate 7*a* and the inclined surface 6*b*. The weld beads 22 shown in FIG. 3 are located in corner types corners C1, C3, C5 and C7. A first corner type C1 is defined between the upper surface of the upper horizontal plate 7*a* and the proximal end surface of the upper boss 4. A further corner type C3 is defined between the lower surface of the upper horizontal plate 7*a* and the side surfaces of the projection 21. Another corner type C5 is defined between the side surfaces of the vertical plate 6 and the end surface of the projection 21. Another corner type C7 is defined between the end surface of the vertical plate 6 and the lower surface 21*c* of the projection 21. In the embodiment of FIG. 3, the load (per unit length) received by the weld beads 22 is reduced because the axle body 3 directly receives part of the load applied to the upper boss 4 through direct engagement with the upper boss 4. However, compared to the first embodiment, the load received by the weld beads 22 is higher. In other words, when a vertical load is applied to the upper boss 4, the proportion of the load received directly by the axle body 3 is greater in the embodiment of FIG. 1 than in the embodiment of FIG. 3.

Figure 4:
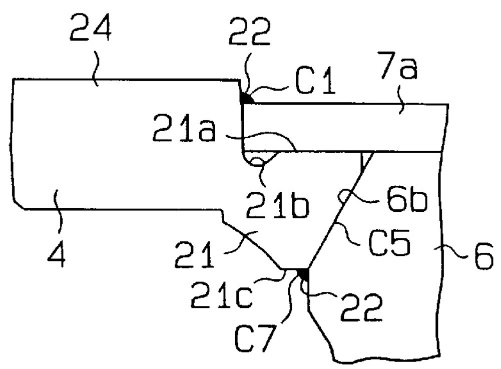
FIG. 4 is a partial diagrammatic side view showing another embodiment.

As shown in FIG. 4, the axle body 3 and the projection 21 are the same as those of FIG. 3, however, the weld locations have been changed. The weld zones of the embodiment of FIG. 4 do not include weld beads in the corners designated by C3 in FIG. 3. In the embodiment of FIG. 4, the load received by the weld beads 22 is reduced because part of the load applied to the upper boss 4 is received directly by the axle body 3 through engagement with the upper boss 4. The omission of the weld beads 22 at the corners designated as C3 in FIG. 3 does not greatly increase the load transmitted by the remaining weld beads 22.

The projection 21 may have any shape as long as it is received between the vertical plate 6 and the upper horizontal plate 7*a*. The load received by the weld bead 22 is reduced when the projection 21 is received between the vertical and upper horizontal plates 6, 7*a,* and part of the load applied to the upper boss 4 is transferred directly to the axle body 3.

Figure 5A:
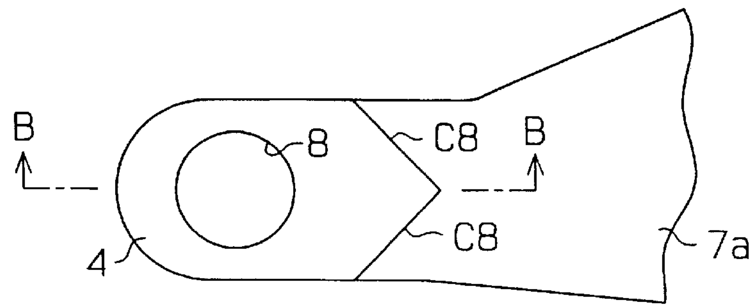
FIG. 5(*a*) is a partial diagrammatic plan view showing another embodiment
Figure 5B:
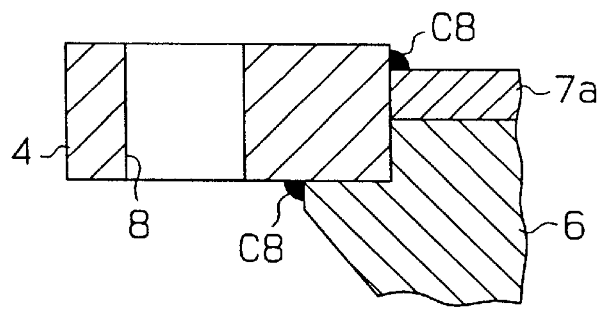

The upper boss may not have the projection 21 received between the vertical plate 6 and the upper horizontal plate 7*a*. As shown in FIGS. 5(*a*) and 5(*b*), the upper boss has a uniform thickness, its proximal end is triangular, and the plates 6, 7*a* are shaped to correspond to the triangular proximal end. That is, contact between the upper boss 4 and the axle body 3 is distributed over a combination of planes. Corners C8 are welded. Corners C8 are defined between each of the contact planes and a perpendicular surface. In this case, the proximal end of the upper boss 4 is not received between the plates 6, 7*a,* and most of the load applied to the upper boss 4 is received by the weld beads 22. However, unlike the prior art, the proximal end surface of the upper boss 4 is not a single planar surface that is perpendicular to the longitudinal axis of the rear axle 1 and is a combination of different planes. Accordingly, the length of the weld beads 22 is longer than that of the prior art and the load received by the weld beads 22 per unit length is reduced. The upper boss 4 and the axle body 3 are easily machined because the proximal end surface is formed by planar surfaces. If the proximal end surface of the upper boss 4 were curved or a combination of a curved surface and a planar surface, machining the upper boss 4 and the axle body 3 would be more difficult. Also, the axle body 3 is easily machined.

Figure 6:
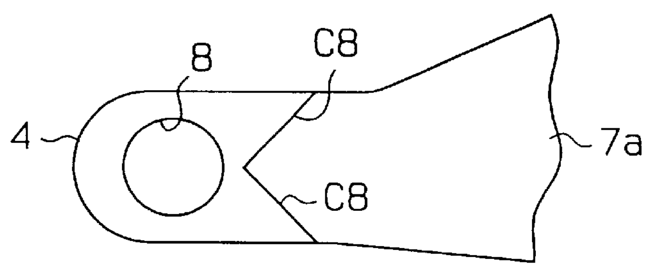
FIG. 6 is a partial diagrammatic plan view showing another embodiment.
Figure 7:
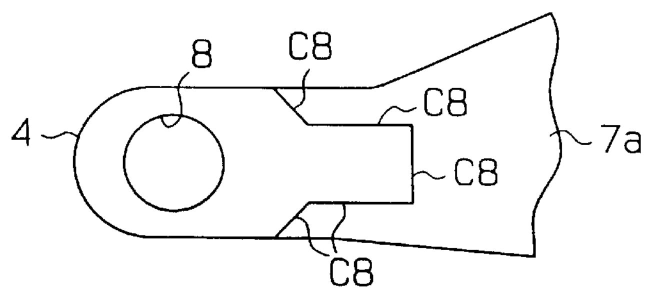
FIG. 7 is a partial diagrammatic plan view showing another embodiment.
Figure 8:
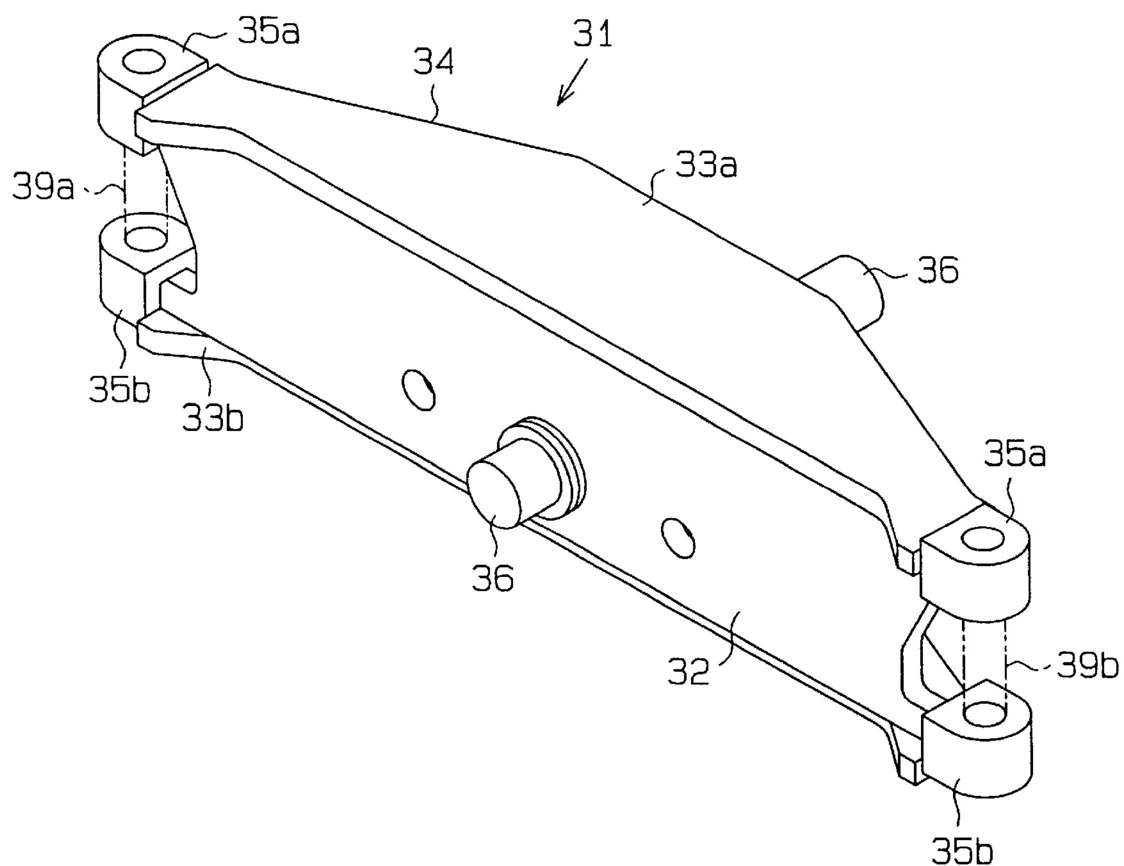
FIG. 8 is a perspective view showing a prior art rear axle.
Figure 9:
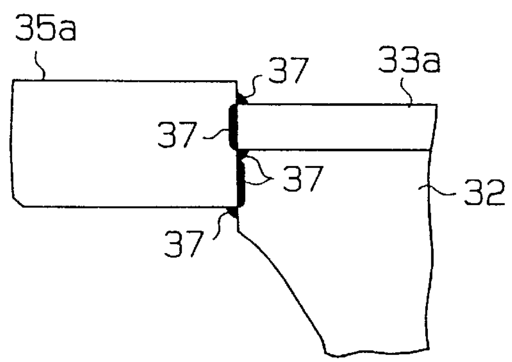
FIG. 9 is a partial front view showing the boss of FIG. 8.

The upper boss 4 can have any shape as long as the contact between the upper boss 4 and the axle body 3 is distributed over a combination of planes. As shown in FIG. 6, the proximal end of the upper boss 4 may have a triangular recess. As shown in FIG. 7, the proximal end of the upper boss 4 may have a tapered section and a rectangular projection extending from the tapered section.

When increasing the length of the weld beads 22 by changing the shape of the proximal end of the upper boss 4, the vertical plate 6 need not be machined as in FIG. 5(*b*). That is, only the upper horizontal plate 7*a* could be machined so that the lower surface of the upper boss 4 contacts the upper edge of the vertical plate 6.

The lower boss 5 may be formed in the same shape as the upper boss 4 and the lower boss 5 may be welded to the axle body 3 such that the lower boss 5 is a mirror image of the upper boss 4. In this case, the weld strength of the lower boss 5 is improved and the upper and lower bosses are common parts. This reduces the cost per unit of the bosses 4, 5.

When the bosses 4, 5 are attached to the axle body 3, the axes of the holes 8 does not have to be vertical, that is, the camber angle is not necessarily zero degrees. The axes of the holes 8 may be inclined.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A rear axle beam for pivotally supporting a body frame of an industrial vehicle, the axle beam comprising:

a substantially rectangular vertical plate, wherein an upper corner of the vertical plate has a step;

a horizontal plate attached to one edge of the vertical plate, wherein a recess is formed between an end of the horizontal plate and the step;

a boss, wherein the boss has a substantially rectangular protrusion to fit in the recess, and the protrusion is welded to the vertical and horizontal plates.

2. The rear axle beam of claim 1, wherein the boss has a pin housing connected to the protrusion, and a corner recess is formed between the pin housing and the protrusion, wherein the corner recess improves the engagement between the axle and the boss.

3. The rear axle beam of claim 1, wherein the protrusion has a planar upper surface for engaging a planar lower surface of the horizontal place and a planar lower surface for engaging a planar upper edge surface of the vertical plate.

4. A rear axle beam for pivotally supporting a body frame of an industrial vehicle, the axle beam comprising:

a substantially rectangular vertical plate, wherein an upper corner of the vertical plate has a chamfered portion;

a horizontal plate attached to one edge of the vertical plate, wherein a wedge-shaped recess is formed between an end of the horizontal plate and the chamfered portion of the vertical plate;

a boss, wherein the boss has a wedge-shaped protrusion to fit in the recess and engage the vertical and the horizontal plates, and the protrusion is welded to the vertical and horizontal plates.

5. The rear axle beam of claim 4, wherein the boss has a pin housing connected to the protrusion, and a corner recess is formed between the pin housing and the protrusion, wherein the corner recess improves the engagement between the axle and the boss.

6. The rear axle beam of claim 4, wherein the protrusion has a planar upper surface for engaging a planar lower surface of the horizontal plate and a planar lower surface for engaging a planar upper edge surface of the vertical plate.

7. The rear axle beam for pivotally supporting a body frame of an industrial vehicle, the axle beam comprising:

a substantially rectangular vertical plate, wherein an upper corner of the vertical plate has a notch;

a horizontal plate attached to one edge of the vertical plate, wherein the horizontal plate is notched at its ends, wherein the notches form recesses;

a pair of bosses, wherein each boss has a protrusion to engage in a corresponding one of the recess and the protrusion is welded to the vertical and horizontal plates.

8. The rear axle beam of claim 7, wherein each end of the horizontal plate is shaped to produce recesses, each recess having more than one vertical planar surface, wherein each boss has a protrusion shaped to correspond to one of the recesses.

9. A rear axle beam for pivotally supporting a body frame of an industrial vehicle, the axle beam comprising:

a substantially rectangular vertical plate, wherein an upper corner of the vertical plate has a step;

a horizontal plate attached to one edge of the vertical plate, wherein a recess is formed between an end of the horizontal plate and the step;

a boss, wherein the boss has a protrusion to fit in the recess and engage the vertical and the horizontal plates, and the protrusion is welded to the vertical and horizontal plates, wherein the protrusion has a planar upper surface for engaging a planar lower surface of the horizontal plate, and the protrusion has a planar lower surface for engaging a planar upper edge surface of the vertical plate.

10. The rear axle beam of claim 9, wherein the boss includes a planar vertical surface located between the axial middle of the axle and the associated distal end of the axle, and wherein the protrusion has a planar vertical end surface for engaging the planar vertical surface of the boss.

* * * * *